US009184790B2

(12) United States Patent
Yano et al.

(10) Patent No.: US 9,184,790 B2
(45) Date of Patent: Nov. 10, 2015

(54) INCOHERENT UWB-IR TRANSCEIVING METHOD WITH IMPROVED MULTIPATH-RESISTANCE

(75) Inventors: Takashi Yano, Tokyo (JP); Hiroshi Kamizuma, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 14/382,422

(22) PCT Filed: Mar. 28, 2012

(86) PCT No.: PCT/JP2012/002134
§ 371 (c)(1),
(2), (4) Date: Sep. 2, 2014

(87) PCT Pub. No.: WO2013/145003
PCT Pub. Date: Oct. 3, 2013

(65) Prior Publication Data
US 2015/0098491 A1 Apr. 9, 2015

(51) Int. Cl.
*H04B 1/00* (2006.01)
*H04B 1/717* (2011.01)
(Continued)

(52) U.S. Cl.
CPC ............. *H04B 1/7174* (2013.01); *H04B 1/709* (2013.01); *H04B 1/717* (2013.01); *H04B 1/719* (2013.01)

(58) Field of Classification Search
CPC .. H04B 1/71637; H04B 1/709; H04B 1/7163; H04B 1/71635; H04B 1/69; H04B 14/026; H04B 1/717; H04L 27/2614; H04L 27/233; H04L 27/2332
USPC ......... 375/150, 142, 353, 238, 343, 340, 239, 375/260
See application file for complete search history.

(56) References Cited

U.S. PATENT DOCUMENTS

| | | | |
|---|---|---|---|
| 2004/0179577 A1 | 9/2004 | Kim | |
| 2006/0140249 A1* | 6/2006 | Kohno | H04B 1/7172 375/130 |
| 2007/0104258 A1 | 5/2007 | Sugiura et al. | |
| 2009/0041096 A1* | 2/2009 | Myers | 375/150 |

FOREIGN PATENT DOCUMENTS

| | | |
|---|---|---|
| JP | 2004-274764 A | 9/2004 |
| JP | 2007-82133 A | 3/2007 |

(Continued)

OTHER PUBLICATIONS

Moe z. Win et al., Ultra-wide Bandwidth Time-Hopping Spread-Spectrum Impulse Radio for Wireless Multiple-Access communications, IEEE Transaction on Communications, Apr. 2000, pp. 679-691,vol. 48, No. 4.

(Continued)

*Primary Examiner* — Rahel Guarino
(74) *Attorney, Agent, or Firm* — Baker Botts L.L.P.

(57) ABSTRACT

There is provided an incoherent UWB-IR communication method by which erroneous demodulation is difficult to occur even in a multipath environment. Thus, the present invention includes an incoherent wireless communication method including a first step of modulating transmission data, a second step of converting the modulated transmission data into pulses and converting the pulses received from the external into reception data, and a third step of demodulating the reception data, wherein the pulses used in the second step includes a plurality of pulse sequences and the plurality of pulse sequences is such that the peaks of cross-correlation values are lower than the peaks of autocorrelation values.

6 Claims, 18 Drawing Sheets

(51) Int. Cl.
*H04B 1/719* (2011.01)
*H04B 1/709* (2011.01)

(56) References Cited

FOREIGN PATENT DOCUMENTS

| | | |
|---|---|---|
| JP | 2008-10989 A | 1/2008 |
| WO | 2004/077775 A | 9/2004 |
| WO | 2008-139687 A1 | 11/2008 |

OTHER PUBLICATIONS

Kazuki Eshima et al., M-ary Impulse Radion (UWB) with Interference Canceller for Multi-user Environment, IEICE Technical Report, CS, Tsushin Hoshiki 101 (30), Apr. 20, 2001, pp. 41-48.

\* cited by examiner

| | S00 | S01 | S10 | S11 |
|---|---|---|---|---|
| S00 | 12 | | | |
| S01 | 5 | 12 | | |
| S10 | 5 | 5 | 12 | |
| S11 | 5 | 4 | 5 | 12 |

FIG. 18

SEQUENCE LENGTH : 128

| | S0000 | S0001 | S0010 | S0011 | S0100 | S0101 | S0110 | S0111 | S1000 | S1001 | S1010 | S1011 | S1100 | S1101 | S1110 | S1111 |
|---|---|---|---|---|---|---|---|---|---|---|---|---|---|---|---|---|
| S0000 | 24 | | | | | | | | | | | | | | | |
| S0001 | 10 | 24 | | | | | | | | | | | | | | |
| S0010 | 10 | 10 | 24 | | | | | | | | | | | | | |
| S0011 | 9 | 8 | 9 | 24 | | | | | | | | | | | | |
| S0100 | 9 | 9 | 11 | 9 | 24 | | | | | | | | | | | |
| S0101 | 9 | 10 | 9 | 10 | 11 | 24 | | | | | | | | | | |
| S0110 | 10 | 9 | 9 | 10 | 10 | 10 | 24 | | | | | | | | | |
| S0111 | 9 | 10 | 9 | 9 | 10 | 10 | 8 | 24 | | | | | | | | |
| S1000 | 9 | 9 | 9 | 9 | 10 | 9 | 9 | 10 | 24 | | | | | | | |
| S1001 | 9 | 9 | 10 | 9 | 9 | 8 | 9 | 9 | 9 | 24 | | | | | | |
| S1010 | 10 | 9 | 9 | 10 | 11 | 8 | 8 | 9 | 10 | 11 | 24 | | | | | |
| S1011 | 8 | 11 | 10 | 8 | 8 | 10 | 9 | 10 | 8 | 10 | 10 | 24 | | | | |
| S1100 | 9 | 9 | 10 | 10 | 8 | 8 | 9 | 11 | 9 | 10 | 10 | 9 | 24 | | | |
| S1101 | 9 | 9 | 10 | 9 | 10 | 11 | 10 | 10 | 9 | 10 | 10 | 10 | 9 | 24 | | |
| S1110 | 9 | 11 | 10 | 8 | 8 | 9 | 8 | 10 | 9 | 11 | 10 | 10 | 10 | 10 | 24 | |
| S1111 | 10 | 9 | 10 | 10 | 8 | 10 | 9 | 9 | 10 | 9 | 11 | 9 | 9 | 10 | 11 | 24 |

SEQUENCE LENGTH : 256

| | S0000 | S0001 | S0010 | S0011 | S0100 | S0101 | S0110 | S0111 | S1000 | S1001 | S1010 | S1011 | S1100 | S1101 | S1110 | S1111 |
|---|---|---|---|---|---|---|---|---|---|---|---|---|---|---|---|---|
| S0000 | 64 | | | | | | | | | | | | | | | |
| S0001 | 25 | 64 | | | | | | | | | | | | | | |
| S0010 | 24 | 24 | 64 | | | | | | | | | | | | | |
| S0011 | 25 | 26 | 26 | 64 | | | | | | | | | | | | |
| S0100 | 25 | 25 | 26 | 24 | 64 | | | | | | | | | | | |
| S0101 | 25 | 26 | 25 | 27 | 26 | 64 | | | | | | | | | | |
| S0110 | 24 | 26 | 28 | 26 | 25 | 27 | 64 | | | | | | | | | |
| S0111 | 26 | 26 | 26 | 27 | 25 | 24 | 26 | 64 | | | | | | | | |
| S1000 | 24 | 24 | 27 | 26 | 24 | 25 | 25 | 24 | 64 | | | | | | | |
| S1001 | 28 | 24 | 24 | 23 | 25 | 26 | 25 | 25 | 26 | 64 | | | | | | |
| S1010 | 25 | 25 | 25 | 24 | 24 | 25 | 27 | 26 | 24 | 26 | 64 | | | | | |
| S1011 | 24 | 25 | 25 | 24 | 24 | 25 | 27 | 25 | 25 | 25 | 27 | 64 | | | | |
| S1100 | 26 | 23 | 28 | 24 | 26 | 27 | 26 | 26 | 26 | 27 | 24 | 26 | 64 | | | |
| S1101 | 29 | 27 | 24 | 25 | 28 | 25 | 26 | 24 | 23 | 24 | 27 | 26 | 23 | 64 | | |
| S1110 | 27 | 26 | 26 | 25 | 27 | 25 | 24 | 25 | 25 | 26 | 25 | 27 | 27 | 28 | 64 | |
| S1111 | 27 | 27 | 24 | 23 | 27 | 25 | 27 | 25 | 27 | 25 | 25 | 28 | 26 | 24 | 25 | 64 |

| f(a,b) | | PN | | | |
|---|---|---|---|---|---|
| | | 0 | 1 | 2 | 3 |
| DATA | 0 | 0 | 1 | 2 | 3 |
| | 1 | 1 | 3 | 0 | 2 |
| | 2 | 2 | 0 | 3 | 1 |
| | 3 | 3 | 2 | 1 | 0 |

| f(a,b) | | PN | | | |
|---|---|---|---|---|---|
| | | 0 | 1 | 2 | 3 |
| DATA | 0 | 0 | 1 | 2 | 3 |
| | 1 | 1 | 3 | 0 | 2 | ent UWB-IR TRANSCEIVING
METHOD WITH IMPROVED
MULTIPATH-RESISTANCE

TECHNICAL FIELD

The present invention relates to a transmission method for a wireless communication device, and particularly to a wireless communication device for making incoherent communication not using a phase of a carrier wave for information transmission.

BACKGROUND ART

There is widely known an Ultra Wide Band-Impulse Radio (UWB-IR) system as a background art of the present technical field. The UWB-IR system is a system for making communication by sending a waveform of a pulse width in a very short time, and a communication signal has a remarkably wide frequency bandwidth due to a short-time pulse width. Pulse polarity modulation, phase shift keying, on off keying, pulse amplitude modulation (PAM), pulse position modulation (PPM) and the like are known as modulation systems used for the UWB-IR communication system. The pulse polarity modulation and the phase shift keying among them are a system for sending information on a phase of a carrier wave, in which phase continuity and phase reproduction are required on the transmission side and the reception side, respectively, which causes a complicated configuration of the transceiving device. The communication system for communicating information on a phase of a carrier wave is called coherent communication method. On the other hand, the pulse amplitude modulation PAN, the on off keying (OOK) and the pulse position modulation PPM do not require phase information for demodulation, and thus a configuration of the transceiving device is simple. In particular, the on off keying (OOK) and the pulse position modulation PPM perform demodulation by determining the presence and positions of pulses, and thus a device configuration is so simple and can be realized at low cost.

For example, PTL 1 discloses therein a UWB-IR communication method for transmitting information by changing positions in time domain (timing) for sending pulses depending on transmission data (FIG. 5 in PTL 1). There is illustrated an example in which a signal for which a pulse position is delayed by d is used when transmission data is 0' unlike when transmission data is 1'. Further, NPL 1 similarly discloses therein a UWB-IR communication method for transmitting information by changing positions in time domain (timing) of transmission pulses according to transmission data (Equation (1) in NPL 1).

According to Equation (1) in NPL, there is described a method in which a position in time domain (timing) at the j-th pulse is changed by $d_j^{(k)}(u)$ according to transmission data thereby to generate a transmission signal.

CITATION LIST

Patent Literature

PTL 1: JP 2004-274764 A

Non Patent Literature

NPL 1: "Ultra-Wide bandwidth Time-Hopping Spread-Spectrum Impulse Radio for Wireless Multiple-Access Communications", M. Z. Win, R. A. Scholtz, IEEE Transactions on Communications, Vol. 48, No. 4, April 2000

SUMMARY OF INVENTION

Technical Problem

In the conventional technique, when incoming waves delayed due to a reflected radio wave are superimposed and received, data cannot be normally demodulated. There will be described, by way of example, a case in which two-level PPM modulation for changing positions of single pulses according to transmission data is used as illustrated in FIG. 1. In FIG. 1, when one-bit data of 0 is transmitted, a pulse is sent on the first half of two pulse positions. On the other hand, when one-bit data of 1 is transmitted, a pulse is sent on the second half of the two pulse positions. When a bit sequence "0110101" is transmitted by use of such a modulation system, a pulse waveform as illustrated in FIG. 2 is sent. That is, a pulse is sent at the first pulse position which is on the first half in the first and second pulse positions where the initial bit "0" is transmitted. A pulse is sent at the fourth pulse position which is on the second half in the third and fourth pulse positions for the second bit "1." The pulses are sent at seven positions including the first, fourth, sixth, seventh, 10-th, 11-th, and 14-th pulse positions among the 14 pulse positions, thereby transmitting seven-bit data in total.

When such a transmission sequence is received, a demodulator separates it every two pulse positions from the head and determines whether the pulse is on the first half or the second half, thereby determining a bit of "0" is sent or a bit of "1" is sent. When delayed waves are superimposed and received due to multipath described above, however, a reception signal is as illustrated in FIG. 3, for example. In the figure, the solid line indicates an original reception signal and the broken line indicates a delayed reception signal. In this case, a pulse is received at both the first two pulse positions, and thus it is impossible to determine whether "0" or "1" is sent. Similarly, a pulse is received at the pulse positions of both the first and second halves at the third bit, the fourth bit and the sixth bit, and thus correct demodulation cannot be performed.

The above-described example is for two-level PPM using single pulses, but similar problems are caused for two-level PPM using a plurality of pulses in the conventional technique described in PTL 1. That is, when a delay wave delayed by time d illustrated in FIG. 5 in PTL 1 is superimposed and received, the pulses are received at the same pulse positions as the bit of "0" is transmitted although the bit of "1" is transmitted, and thus it is impossible to determine whether "0" or "1" is sent. Also with the technique described in NPL 1, data is sent by changing positions in time domain (timing) of pulses by $d_j^{(k)}(u)$ according to transmission data, and thus the same pulse sequences can be superimposed and received as data different from original transmission data is transmitted due to superimposed delay wave, which causes reception errors.

Solution to Problem

In order to solve the above problems, the configurations described in Claims are employed. The present application includes a plurality of means for solving the above problems, and one example of them is an incoherent wireless communication method which includes a first means for modulating transmission data, a second means for converting the modulated transmission data into pulses and converting the received pulses into reception data, and a third means for demodulating the reception data, wherein the pulses used in the second means includes a plurality of pulse sequences and the peaks of cross-correlation values are lower than the peaks of autocorrelation values for the plurality of pulse sequences.

Alternatively, a wireless communication device using the incoherent wireless communication method includes a modulation unit that modulates transmission data, a radio frequency unit that converts the transmission data modulated in the modulation unit into pulses and converting the received pulses into reception data, and a demodulation unit that demodulates the reception data, wherein the pulses used in the radio frequency unit includes a plurality of pulse sequences and the peaks of cross-correlation values are lower than the peaks of autocorrelation values for the plurality of pulse sequences.

Advantageous Effects of Invention

According to the invention, reception is enabled without any error even in an environment in which a delay wave due to multipath is present in an incoherent communication system and a communication device using the same.

BRIEF DESCRIPTION OF DRAWINGS

FIG. 14 is a diagram illustrating exemplary pulse sequences used for the four-level demodulator according to the present invention.

FIG. 15 is a diagram illustrating correlation characteristics of the pulse sequences of FIG. 14.

FIG. 18 is a diagram illustrating exemplary correlation characteristics of the pulse sequences used for the 16-level modulator according to the present invention.

DESCRIPTION OF EMBODIMENTS

Figure 1:
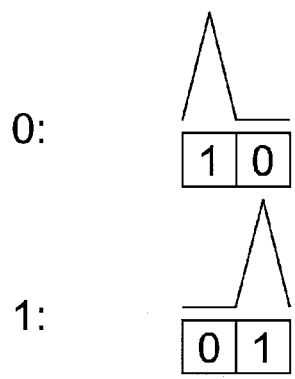
FIG. 1 is a diagram for explaining a two-level PPM system with single pulses.
Figure 2:
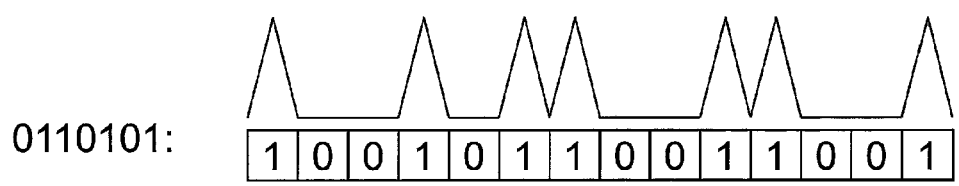
FIG. 2 is a diagram illustrating an exemplary transmission pulse sequence in the two-level PPM system with single pulses.
Figure 3:
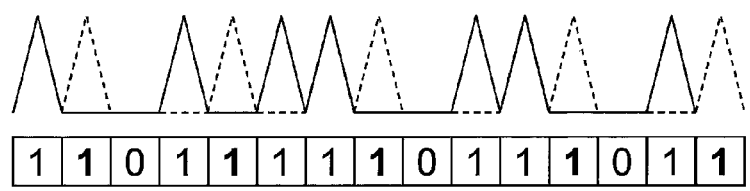
FIG. 3 is a diagram illustrating an example in which multipath of a reception pulse sequence in the two-level PPM system with single pulses is present.

Embodiments will be described below with reference to the drawings.

First Embodiment

In order to solve the above problems, the present invention uses a communication method in which transmission is performed by use of pulse waveforms which are not similar to each other when different data is transmitted and received even when the pulse waveforms are shifted in time domain, respectively. In other words, the communication method according to the present invention is such that pulse sequences used for communication are configured such that cross-correlation between pulse waveforms has a small correlation value when difference data is transmitted and received.

Specifically, for example, there is assumed a method for preparing a plurality of pulse sequences generated in a random number manner in association with data to be transmitted, and selecting and transmitting a sequence from the plurality of pulse sequences according to the transmission data. In this case, different random number pulse sequences are transmitted when different items of data are transmitted, but the different random number sequences are not generally similar to each other even if the different random number sequences are shifted in time domain, and have a small cross-correlation value, and thus the transmission method according to the present invention is achieved. Cross-correlations between the plurality of pulse sequences and a reception sequence is calculated on the reception side, and data associated with a sequence having the largest correlation is determined as being transmitted.

With the transmission method according to the present invention, when multipath is present and a delay wave is superimposed and received, the sequences which are obtained by shifting in time domain the sequences generated in a random number manner are superimposed, but also in this case, the sequences are not similar to the transmission sequence when different items of data are transmitted, or a cross-correlation value between the transmission sequence and the delay wave sequence is low, thereby preventing erroneous reception. More specifically, for example, it is assumed that pulse sequences A and B are configured such that cross-correlation between the pulse sequence A and the pulse sequence B is sufficiently smaller than the autocorrelation values between the pulse sequences A and between the pulse sequences B, for example, such that any value of the cross-correlation values does not reach ½ of the autocorrelation value. In this case, even when the pulse sequence A is transmitted and two incoming waves with any delay are superimposed, the cross-correlation value between the pulse sequence A and the pulse sequence B as reception sequences does not reach the autocorrelation value between the pulse sequences A, and thus demodulation is enabled without any error. Of course, the effects of the present invention can be obtained within a range where an error can be corrected by error correction even when the cross-correlation value is higher than ½ of the autocorrelation value.

Figure 4:
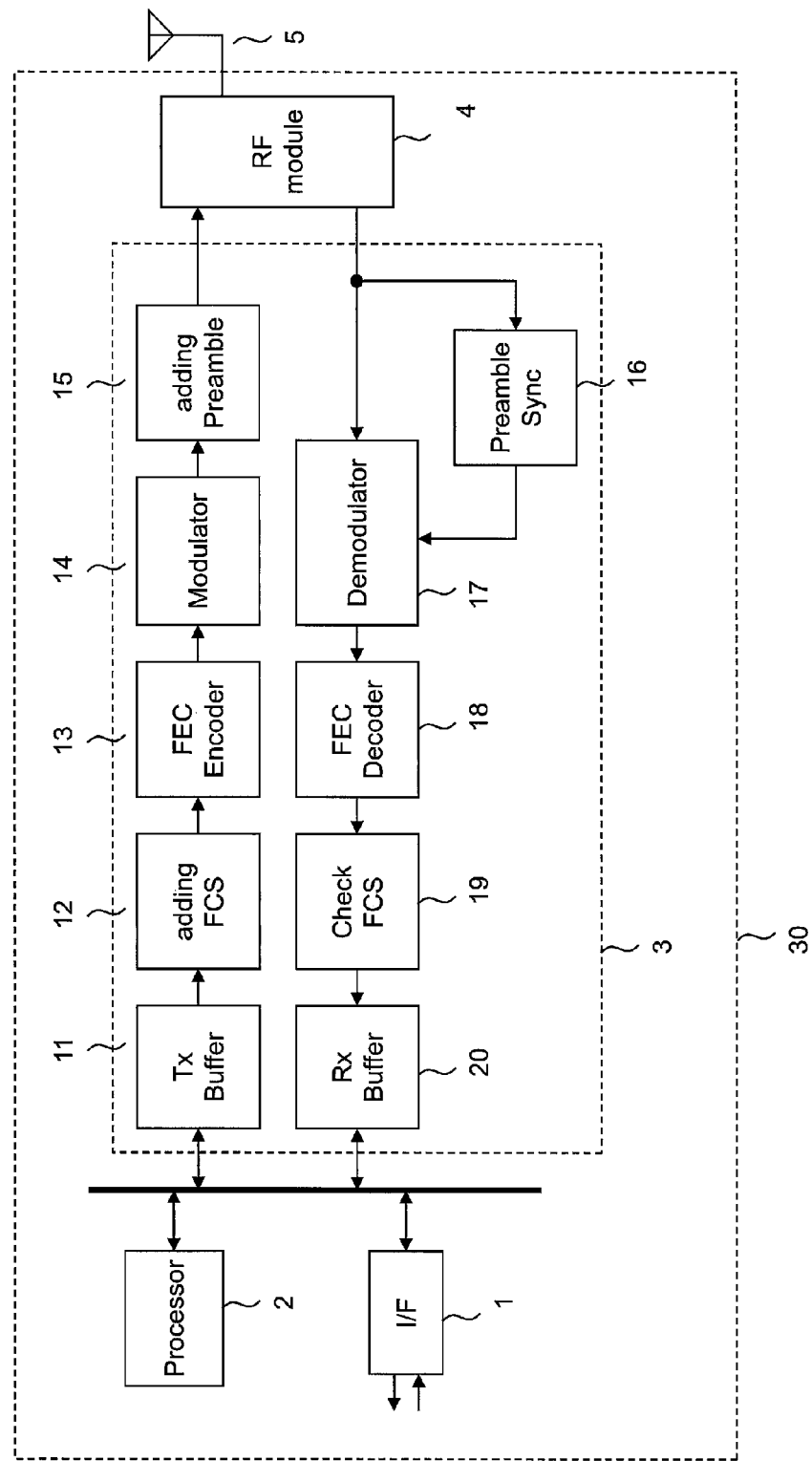
FIG. 4 is a diagram illustrating an exemplary entire configuration of a wireless communication device according to the present invention.

In particular, an exemplary configuration of a wireless communication device for making communication in a UWB-IR system with improved multipath-resistance will be described according to the present embodiment. FIG. 4 illustrates an exemplary entire configuration of a wireless communication device 30 according to the present embodiment. An interface unit 1 that exchanges transmission and reception signals with the external, a processor 2 such as CPU or DSP, and a baseband signal processing unit 3 are connected to each other via a bus. Further, the baseband signal processing unit 3 is connected to a radio frequency (RF) unit 4. The radio frequency (RF) unit 4 is connected to an antenna 5. Transmission data read by the processor 2 via the interface unit 1 is written into a transmission buffer 11. When data is written into the transmission buffer 11 and a transmission operation is started, a Frame Check Sequence (FCS) addition unit 12 adds an error detecting code in a Cyclic Redundancy Check (CRC) system or the like. Error correction encoding is then performed by an error correction encoder 13. The transmission data subjected to error correction encoding is modulated by a modulator 14.

Figure 5:
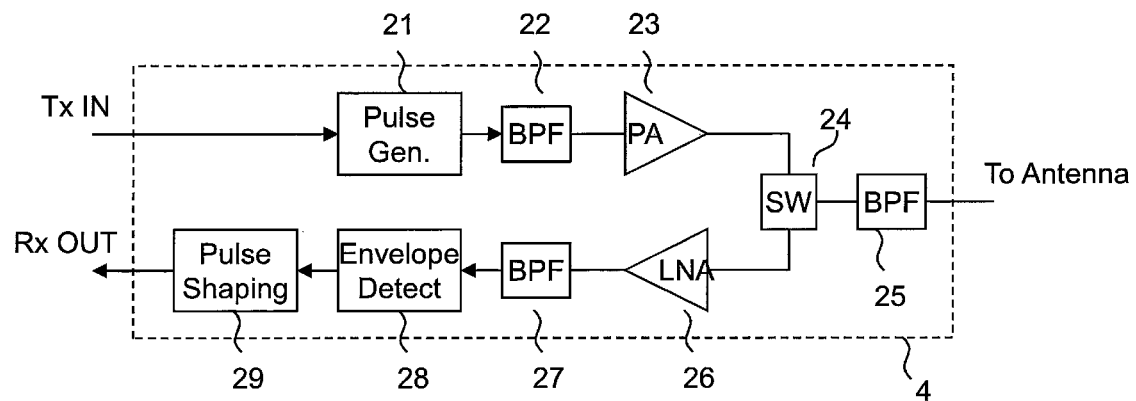
FIG. 5 is a diagram illustrating an exemplary configuration of a radio frequency unit in the wireless communication device according to the present invention.

An exemplary configuration of the radio frequency (RF) unit 4 according to the present embodiment is illustrated below in FIG. 5. The transmission data supplied from the baseband signal processing unit 3 is converted into a pulse sequence with a remarkably narrow time width in a pulse generator 21. An unnecessary frequency band is removed from the pulse sequence with a remarkably narrow time width by a band-pass filter (BPF) 22 and a spectrum shape thereof is shaped to be supplied to a power amplifier (PA) 23. A transmission signal amplified by the power amplifier (PA) 23 is transmitted from the antenna 5 via an antenna switch 24 and a band-pass filter (BPF) 25. On the other hand, an unnecessary frequency band of the signal received by the antenna 5 is removed by the band-pass filter (BPF) 25, which is supplied to a low noise amplifier (LNA) 26 via the antenna switch 24. An unnecessary frequency band of the reception signal amplified by the low noise amplifier (LNA) 26 is removed by a band-pass filter (BPF) 27 again and is detected by an envelope detector 28. A pulse shape (waveform) of the detected reception signal is shaped in a pulse shaping unit 29, which is supplied to the baseband signal processing unit 3.

The modulated transmission data is added with preamble by a preamble addition unit 15 to be supplied to the radio frequency (RF) unit 4, and is converted into an ultra wide band (UWB) signal to be sent from the antenna 5.

On the other hand, the signal received by the antenna 5 is converted into a baseband signal by the radio frequency (RF) unit 4 and is supplied to the baseband signal processing unit 3. The baseband signal supplied from the radio frequency (RF) unit 4 is first subjected to preamble detection and its timing extraction by a preamble synchronization unit 16. A demodulator 17 performs a data demodulation processing at a preamble timing detected by the preamble synchronization unit 16. The demodulated data is subjected to error correction by an error correction decoder 18. A FCS checking unit 19 checks, by an error detecting code, whether all the errors are corrected by the error correcting. An error checking result and decoded data are written into a reception buffer 20 and are read by the processor 2. The reception data read by the processor 2 is sent to the external via the interface unit 1.

The error detecting code used by the FCS addition unit 12 and the FCS checking unit 19 may use so-called check sum or the like instead of the CRC. Further, the error detecting code used by the error correction encoder 13, and the error correction decoder 16 may use general error detecting codes such as Reed-Solomon code, BCH code, convolutional code, Turbo-code and Low-density Parity-check (LDPC) code. A pulse sequence which is well known in both transmission and reception and can have a sharp peak in autocorrelation characteristics is desirable for preamble. Thereby, it is possible for the reception side to precisely and accurately fine preamble timings. Further, it is desirable that the preamble cannot have a large correlation with a modulation signal output from the modulator 14. Thereby, it is possible to prevent erroneous synchronization from occurring due to the transmission data. A pulse sequence generated in a random number manner with such characteristics may be used, for example.

An exemplary configuration of the modulator 14 will be described below. In the present embodiment, the modulator 14 can be configured as in FIG. 6, for example. The modulator in FIG. 6 performs a two-level modulating operation of selecting and sending two pulse sequences S0 and S1 with a modulation unit of one bit for each one-bit input. The two pulse sequences S0 and S1 are output from pulse sequence generators 101-a and 101-b, respectively.

Figure 8:
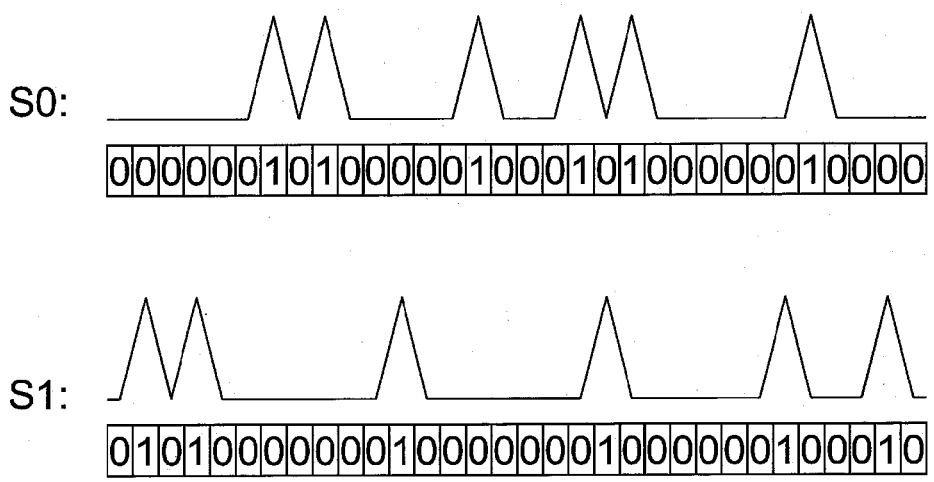
FIG. 8 is a diagram illustrating exemplary pulse sequences used for the two-level demodulator according to the present invention.
Figure 9:
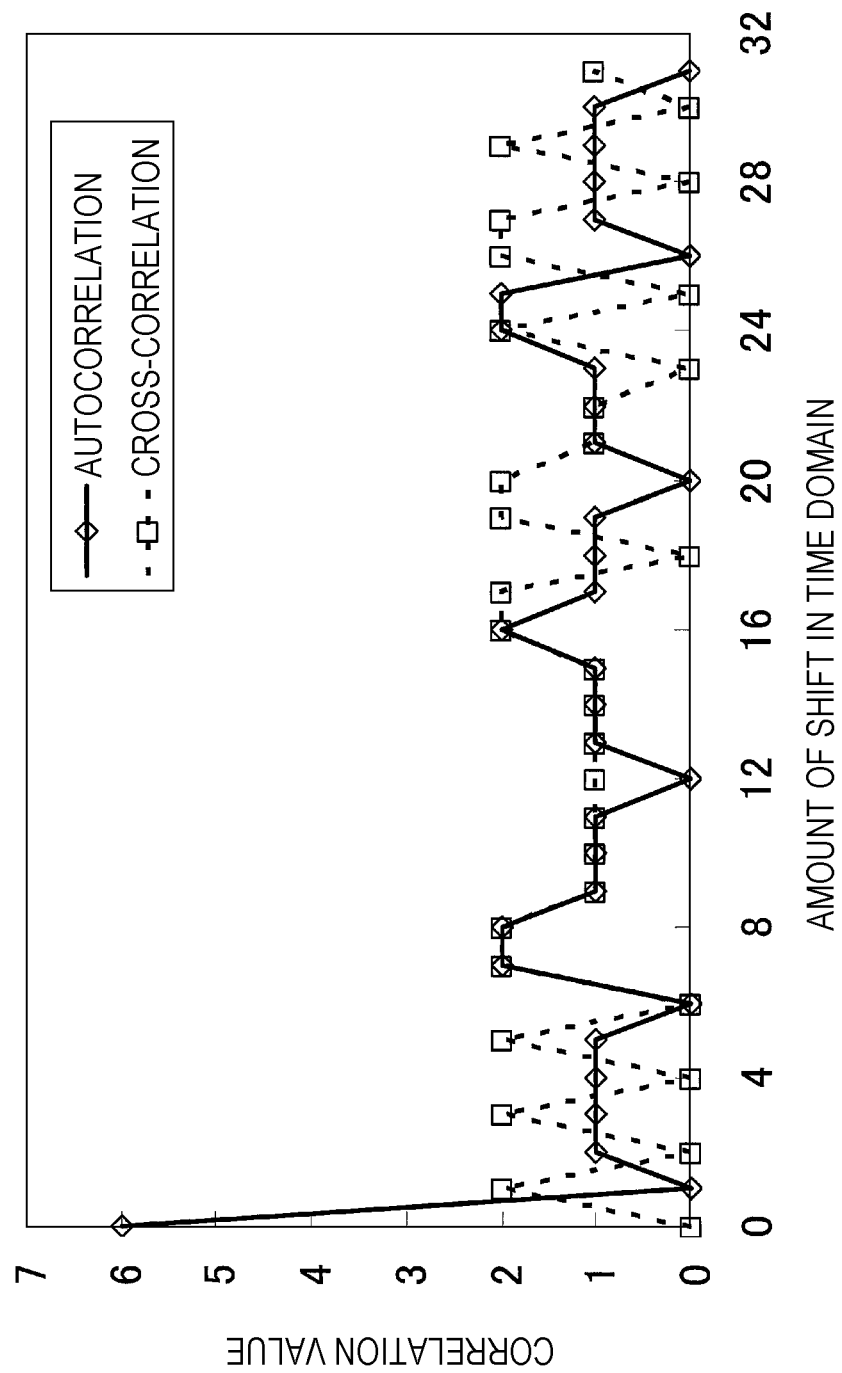
FIG. 9 is a diagram illustrating correlation characteristics of the pulse sequences of FIG. 8.

The pulse sequences output from the pulse sequence generators 101-a and 101-b are selected by a selector 102 and output by the modulator 14. At this time, the selector 102 selects output S0 of the pulse sequence generator 101-a when the transmission data is 0, and selects output S1 of the pulse sequence generator 101-b when the transmission data is 1. The pulse sequences S0 and S1 as illustrated in FIG. 8 are used, for example. That is, for both S0 and S1, six pulses are arranged at pseudo random positions for 32 positions where pulses can be arranged. Each pulse has only a single sign (positive in FIG. 8) so as to be used for incoherent communication. Further, the cross-correlation value between S0 and S1 is designed to be sufficiently lower than the autocorrelation values or to be less than ½ thereof in the present embodiment even when the pulse sequences are shifted in time domain. The autocorrelation characteristics between S0s and the cross-correlation characteristics between S0 and S1 are illustrated in FIG. 9. The autocorrelation between S0s takes a correlation value (vertical axis) of 6 at a matched timing (0 on the horizontal axis), while the cross-correlation takes up to 2 at any timing of shift in time domain.

In order to generate the sequences, assuming the number of pulse positions where pulses can be arranged as N, the number of arranged pulses as P, the number of pulse sequences to be generated as M, and a maximum permitted value of cross-correlation as K, the pulse sequences can be generated in the following procedures:

(1) To generate a random number (integer) X between 0 and N.
(2) To return to (1) when a pulse is already arranged at position X.
(3) To arrange a pulse at position X.
(4) To return to (1) when the number of arranged pulses is less than P.
(5) To examine cross-correlation characteristics when a previously-generated pulse sequence is present.
(6) To delete all pulses when the maximum value of the cross-correlation value exceeds K, and return to (1).
(7) To return to (1) when the number of previously-generated pulse sequences is less than M, and to generate a new pulse sequence. N=32, P=6, M=2 and K=2 are assumed for designing the above S0 and S1. Further, a condition of (2)' to return to (1) when a pulse is already arranged at position X+1 or X−1 is added to the procedure (2) for designing S0 and S1 in FIG. 8, which causes a minim pulse interval to be 2 or more. Thereby, an effect that the pulses can be easily separated on the reception side can be expected. When a condition under which designing is impossible is set in the above design procedures, the procedures cannot be terminated. In this case, an adjustment such as increasing N, decreasing P or increasing K may be made.

An exemplary configuration of the demodulator 17 is illustrated below in FIG. 7. The demodulator 17 calculates the correlation values between a reception signal and the pulse sequences S0 and S1 at timings detected by the preamble synchronization unit 16, and performs demodulation assuming a sequence with a larger correlation value as being transmitted. That is, pulse sequence generators 103-a and 103-b generate the pulse sequences S0 and S1 according to timings detected by the preamble synchronization unit 16, respectively. The generated pulse sequences S0 and S1 are multiplied with the reception signal in multipliers 104-a and 104-b, respectively. Herein, when it is assumed that the pulse sequences S0 and S1 are two-level including 0 and 1 and the reception signals take 1 when both a reception signal and pulses are present and take 0 when no pulse is present, the multipliers 104-a and 104-b output 1 for both inputs of 1, and otherwise output 0, and thus can be simply configured in the logical product (AND) operation. The multiplication results are accumulated by sequence lengths in accumulators 105-a and 105-b and are output as the correlation values, respectively. When accumulations in the sequence lengths are completed, the correlation values are compared in a comparator 106, and the demodulation result of 0 when the output of the accumulator 105-a is larger or 1 when the output of the accumulator 105-b is larger is output.

Figure 10:
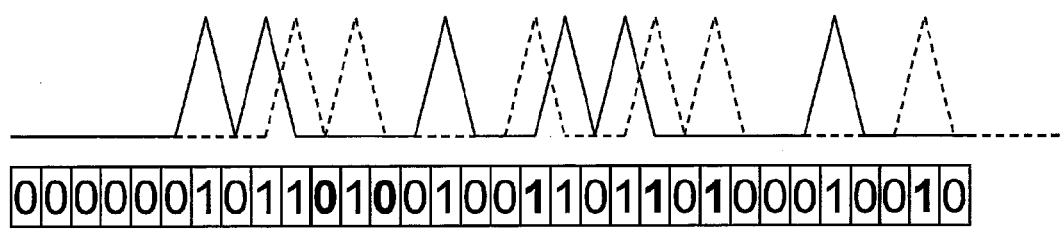
FIG. 10 is a diagram illustrating an example in which multipath of a reception pulse sequence is present according to the present invention.
Figure 11:
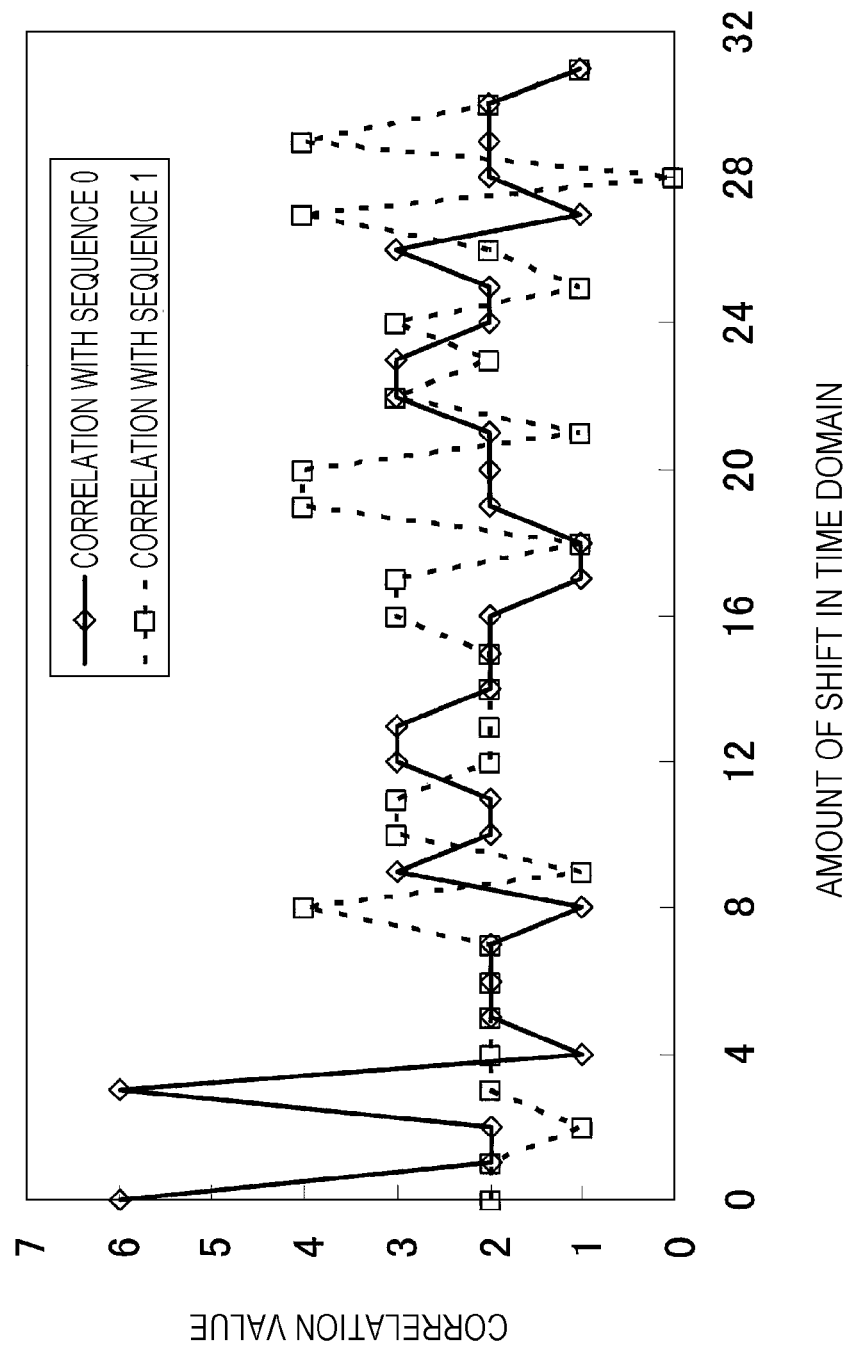
FIG. 11 is a diagram illustrating correlation characteristics when multipath of a reception pulse sequence is present according to the present invention.

An effect when two-level modulation is performed by use of the pulse sequences S0 and S1 illustrated in FIG. 8 designed in the above procedures will be described below. It is assumed that modulation data of 0 is input into the modulator 14 and the sequence S0 is transmitted. FIG. 10 illustrates an example in which a delay wave due to multipath is superimposed and received in addition to a direct wave in radio propagation. The amount of delay of the delay wave is assumed to be as much as three pulse positions, the solid line indicates a reception pulse due to the direct wave and the broken line indicates a reception pulse due to the delay wave. In this case, output of the pulse shaping unit 29 for the superimposed reception signal is a sequence including 0 and 1 indicated in the frame at the bottom of FIG. 10. The correlation characteristics between the reception sequence, and the pulse sequence 0 (S0) and the pulse sequence 1 (S1) are illustrated in FIG. 11. The correlation value (vertical axis) is at the horizontal axis of 0 when the preamble synchronization unit 16 captures a timing of the direct wave and at the horizontal axis of 3 when it captures a timing of the delay wave. In any case, the correlation value for the sequence 0 (S0) is 6 and the correlation value for the sequence 1 (S1) is 2, and it can be seen that the correlation value for the sequence 0 (S0) is higher and demodulation is correctly performed. The correlation value for the sequence 1 (S1) at a different timing is up to 4 and a correlation value exceeding the same is not present. This is because the maximum value of cross-correlation between S0 and S1 is designed to be 2, and even when two waves having any delay time relationship are superimposed and received, a sum of the maximum values of 2 of the correlation values does not exceed 4. That is, even in an environment in which any two-wave multipath occurs, erroneous demodulation due to multipath does not occur.

More generally, it is assured that erroneous demodulation due to multipath does not occur in a multipath environment in which the number of paths is smaller than a ratio P/K of the number of arranged pulses (or autocorrelation value) P relative to the maximum permitted value K of cross-correlation in the pulse sequence design procedures. Thus, multipath-resistance can be assured for two waves at P/2>K and three waves at P/3>K. When the pulse sequence length N is large to some extent, the maximum correlation values are less likely to be superimposed on each other due to multipath, and even when the number of paths is larger than P/K, demodulation can be performed correctly in most cases. This is because the sequences generated in a random number manner are "not similar" to each other, and is caused by the characteristics that even if one sequence shifted in time domain is superimposed on the other sequence, it is "not similar" to the other sequence, or a large correlation value does not occur.

Based on the above, the wireless communication method according to the present embodiment includes a first step of modulating transmission data, a second step of converting the modulated transmission data into pulses and converting the pulses received from the external into reception data, and a third step of demodulating the reception data, wherein the pulses used in the second step includes a plurality of pulse sequences and the peaks of cross-correlation values are lower than the peaks of autocorrelation values for the plurality of pulse sequences.

The wireless communication device 30 according to the present embodiment includes the modulation unit that modulates transmission data, the radio frequency unit that converts the transmission data modulated in the modulation unit into pulses and converting the pulses received from the external into reception data, and the demodulation unit that demodulates the reception data, wherein the pulses used in the radio frequency unit includes a plurality of pulse sequences and the peaks of cross-correlation values are lower than the peaks of autocorrelation values for the plurality of pulse sequences.

Figure 6:
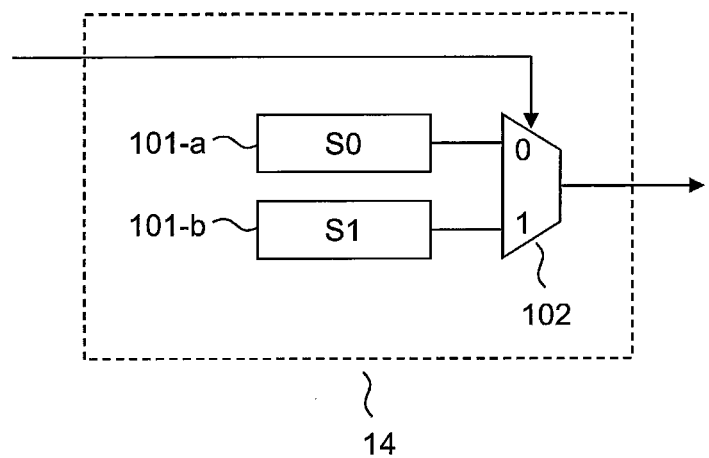
FIG. 6 is a diagram illustrating an exemplary configuration of a two-level modulator according to the present invention.
Figure 7:
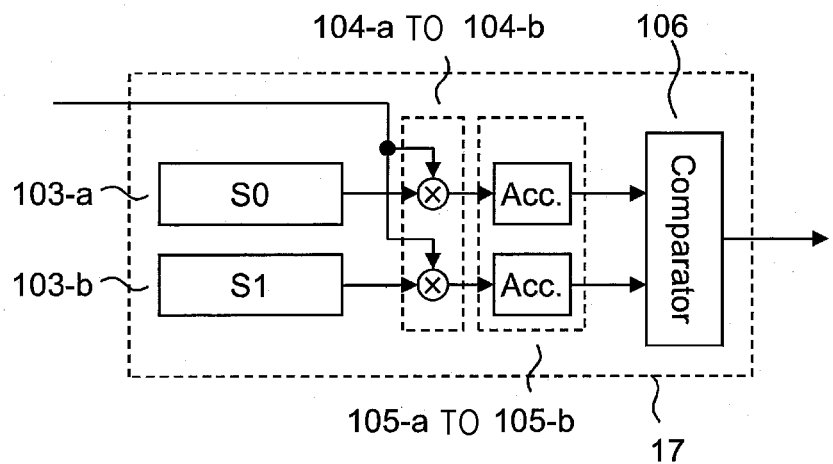
FIG. 7 is a diagram illustrating an exemplary configuration of a two-level demodulator according to the present invention.

Thus, multipath-resistance can be improved by the communication method for transmission in the modulation system in which a plurality of pulse sequences (S0, S1) generated in a random number manner is prepared and a pulse sequence to be transmitted is selected (102) according to transmission data as illustrated in FIG. 6 on the transmission side and for reception in the demodulation system in which correlation operations between the plurality of pulse sequences (S0, S1) and a reception signal are performed and data corresponding to a sequence having a larger correlation value is determined as being transmitted as illustrated in FIG. 7 on the reception side.

One bit is transmitted at two-pulse time and one pulse in the two-level PPM transmission in the present embodiment unlike the conventional simple two-level PPM transmission illustrated in FIG. 1, while one bit is transmitted at 32-pulse time and 6 pulses in the present embodiment. That is, the transmission rate is lower than in the two-level PPM transmission, while the energy allocated to one-bit transmission is six times and longer distance communication is enabled than in the two-level PPM transmission.

Second Embodiment

In the present embodiment, an exemplary communication method for performing four-level modulation instead of two-level modulation used in the first embodiment will be described. Similarly to the first embodiment, the present embodiment uses a plurality of pulse sequences for which the peaks of cross-correlation values are lower than the peaks of autocorrelation values and any autocorrelation value is also lower than ½ of the peak of an autocorrelation value. The entire configuration of the wireless communication device 30 and the radio frequency (RF) unit are as previously illustrated in FIG. 4 and FIG. 5, respectively, and are the same as in the first embodiment, and thus a description thereof will be omitted.

Figure 12:
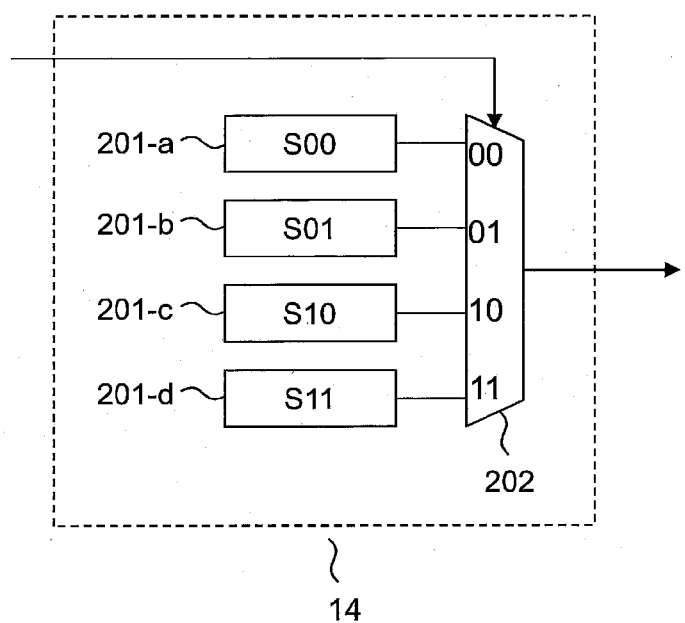
FIG. 12 is a diagram illustrating an exemplary configuration of a four-level modulator according to the present invention.

An exemplary configuration of the modulator 14 according to the present embodiment is illustrated in FIG. 12. The modulator in FIG. 12 is of a modulation unit of two bits, and performs a four-level modulating operation of selecting and sending four pulse sequences S00, S01, S10 and S11 per input two bits. The four pulse sequences S00, S01, S10 and S11 are output from pulse sequence generators 201-*a*, 201-*b*, 201-*c* and 201-*d*, respectively. The pulse sequences output from the pulse sequence generator 201-*a*, 201-*b*, 201-*c* and 201-*d* are selected in a selector 202 and are output by the modulator 14. At this time, the selector 202 selects the output S00 from the pulse sequence generator 201-*a* for transmission data of "00", the output S01 from the pulse sequence generator 201-*b* for transmission data of "01", the output S10 from the pulse sequence generator 201-*c* for transmission data of "10", and the output S11 from the pulse sequence generator 201-*d* for transmission data of "11."

An exemplary configuration of the demodulator 17 according to the present embodiment is illustrated below in FIG. 13. The demodulator 17 calculates the correlation values between a reception signal and the pulse sequences S00, S01, S10 and S11 at timings detected by the preamble synchronization unit 16, and performs demodulation assuming a sequence having the largest correlation value as being transmitted. That is, the pulse sequences S00, S01, S10 and S11 are first generated in pulse sequence generators 203-*a*, 203-*b*, 203-*c*, and 203-*d*, respectively, at timings detected by the preamble synchronization unit 16. The generated pulse sequences S00, S01, S10 and S11 are multiplied by a reception signal in multipliers 204-*a*, 204-*b*, 204-*c* and 204-*d*, respectively. The multipliers 204-*a*, 204-*b*, 204-*c*, and 204-*d* can be simply configured in the logical product (AND) operation similarly to the multipliers 104-*a* and 104-*b* according to the first embodiment. The multiplication results are accumulated by sequence lengths in accumulators 205-*a*, 205-*b*, 205-*c* and 205-*d* and are output as the correlation values, respectively. When accumulations in the sequence lengths are completed, the correlation values are compared in a comparator 206, and "00" when the output of the accumulator 205-*a* is the largest, "01" when the output of the accumulator 105-*b* is the largest, "10" when the output of the accumulator 105-*c* is the largest, and "11" when the output of the accumulator 105-*d* is the largest are output as the demodulation results.

Figure 13:
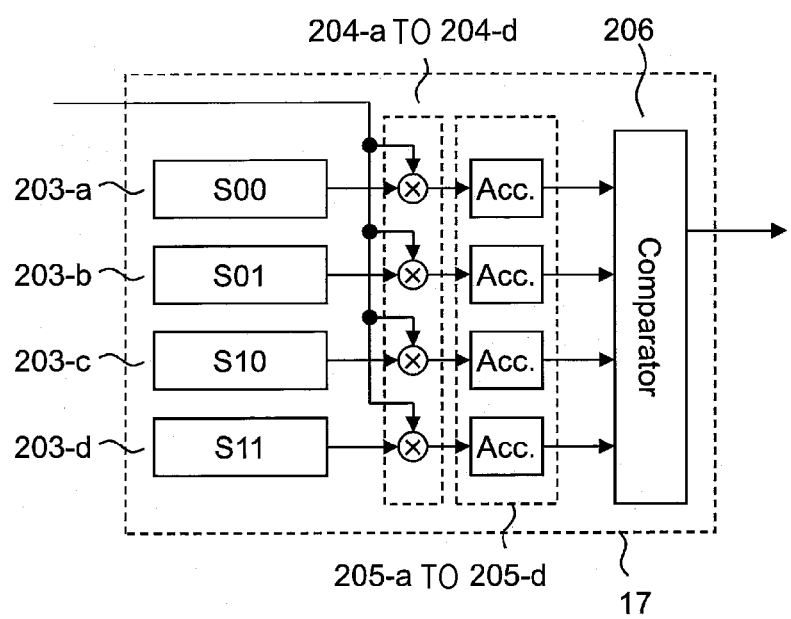
FIG. 13 is a diagram illustrating an exemplary configuration of a four-level demodulator according to the present invention.
Figures 14, 15:
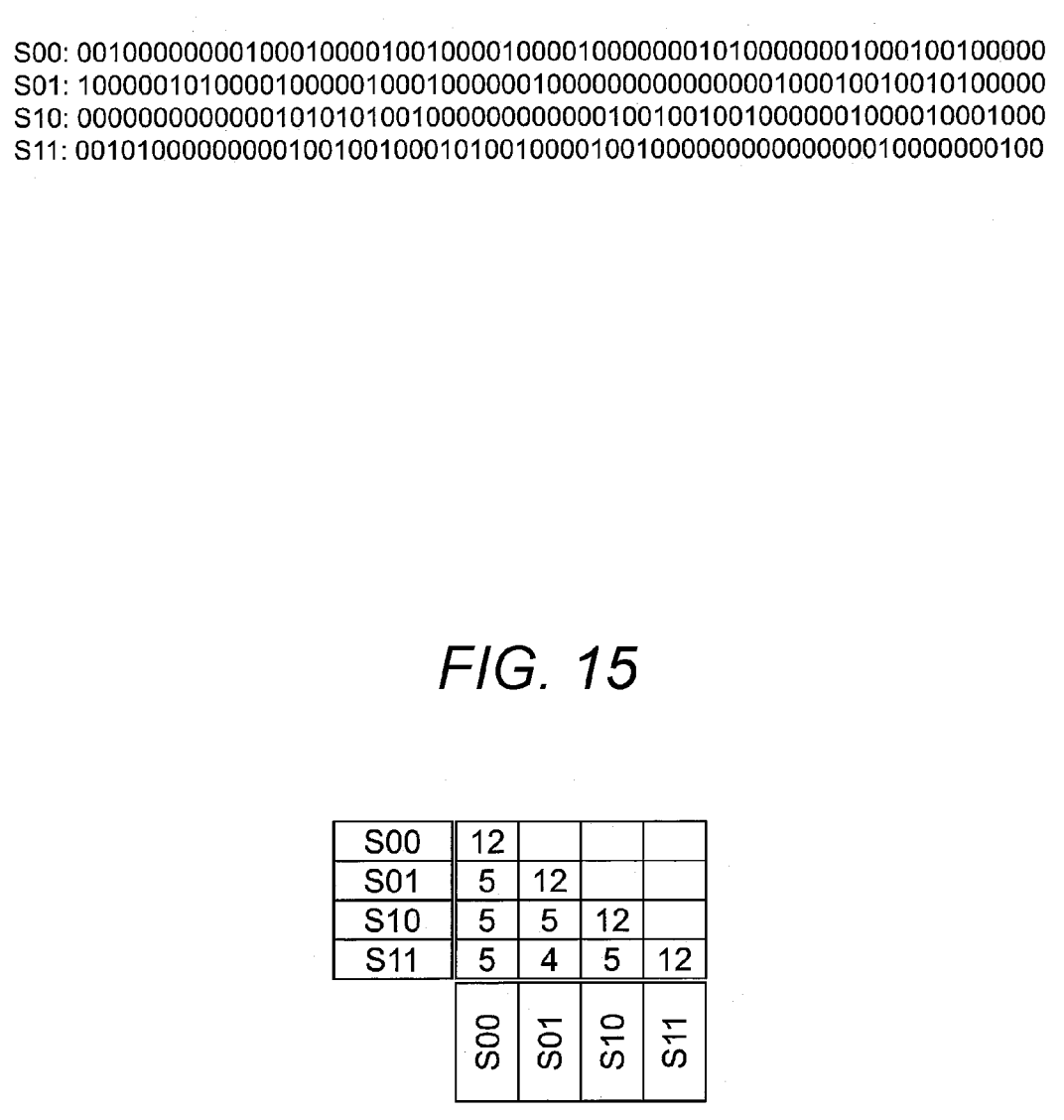

Exemplary designs of the pulse sequences S00, S01, S10, and S11 used in the modulator in FIG. 12 and the demodulator in FIG. 13 described above are illustrated in FIG. 14. The sequences illustrated in FIG. 14 are designed in the pulse sequence design procedures assuming the number of pulse positions N (sequence length) where pulses can be arranged as 64, the number of arranged pulses P as 12, the number of generated pulse sequences M as 4, and the maximum permitted value K of cross-correlation as 5. The correlation characteristics of the pulse sequences illustrated in FIG. 14 are indicated in the table of FIG. 15. The autocorrelation values between S00s, between S01s, between S10s and between S11s are the number of pulses P=12. The maximum values of cross-correlation values between different sequences, which can be obtained when being mutually shifted in time domain, are described in FIG. 15. The maximum permitted value K of cross-correlation is designed at 5, and thus the maximum value of the cross-correlation is 5. Therefore, in the present embodiment, when communication is made by use of the pulse sequences illustrated in FIG. 14, erroneous demodulation due to multipath does not occur in any two-wave multipath environment due to P/K=12/5>2. Erroneous demodulation hardly occurs in a three- or more-wave multipath environment.

The present invention for performing four-level modulation has been described above. In comparison with the first embodiment, a 32-pulse position time and six pulses are used for transmitting one bit in the first embodiment, while a 64-pulse time and 12 pulses are used for transmitting two bits in the second embodiment, and the transmission rate and the transmission energy per bit are equal to each other. However, the communication system according to the present invention is a kind of M-ary system, and thus noise resistance is higher than the first embodiment due to the property that noise resistance is higher in the 4-ary transmission than in the 2-ary transmission.

Third Embodiment

In the present embodiment, an exemplary communication method for performing 16-level modulation instead of two-level modulation used in the first embodiment will be described. Similarly to the first embodiment, the present embodiment uses a plurality of pulse sequences for which the peaks of cross-correlation values are lower than the peaks of autocorrelation values and any cross-correlation value is lower than ½ of the peak of an autocorrelation value. The entire configuration of the wireless communication device and the radio frequency (RF) unit are as previously illustrated in FIG. 4 and FIG. 5, respectively, and are the same as in the first embodiment, and thus a description thereof will be omitted.

Figure 16:
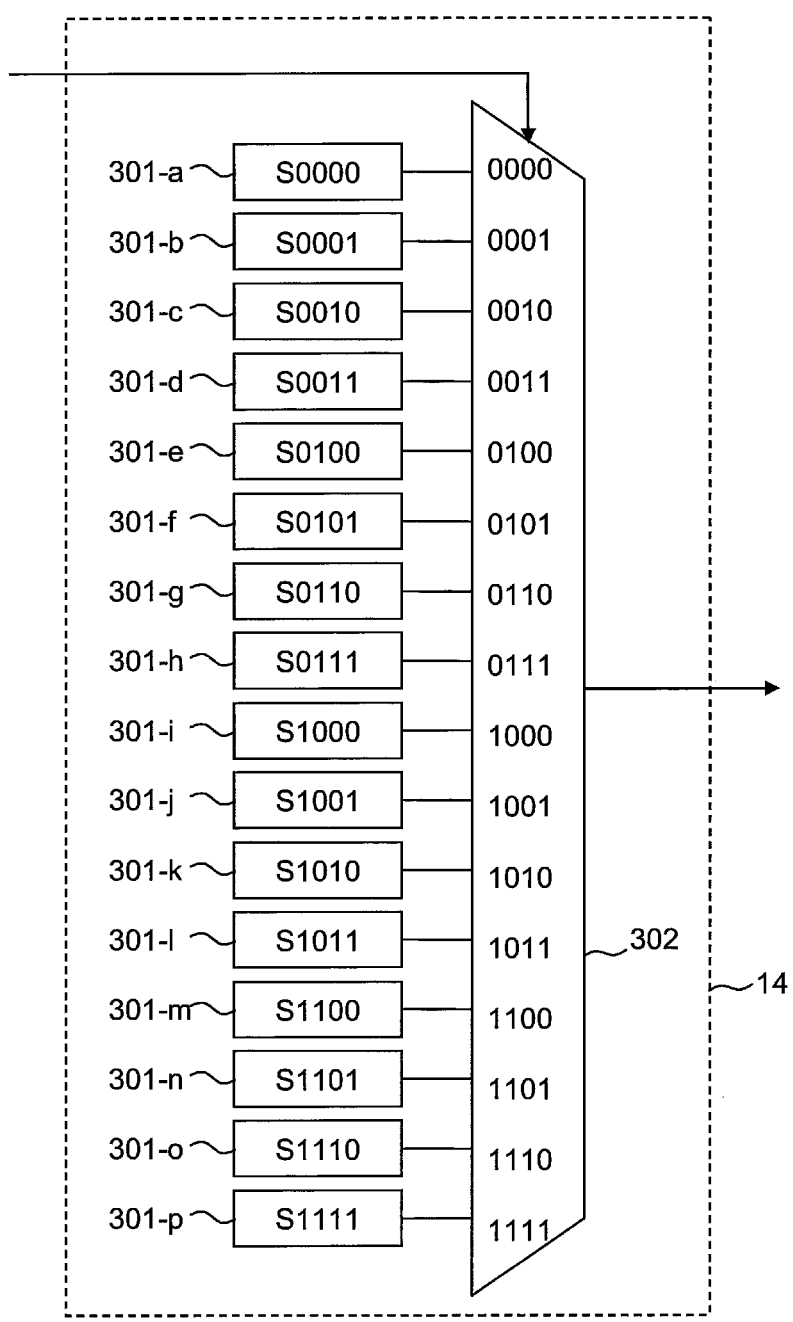
FIG. 16 is a diagram illustrating an exemplary configuration of a 16-level modulator according to the present invention.

An exemplary configuration of the modulator 14 according to the present embodiment is illustrated in FIG. 16. The modulator in FIG. 16 is of a modulation unit of four bits, and performs a 16-level modulating operation of selecting and sending 16 pulse sequences S0000 to S1111 per input four bits. The 16 pulse sequences S0000 to S1111 are output from pulse sequence generators 301-*a* to 301-*p*, respectively. The pulse sequences output from the pulse sequence generators 301-*a* to 301-*p* are selected in a selector 302 and are output by the modulator 14. At this time, the selector 302 selects and outputs the sequences S0000 to S1111 corresponding to the transmission data "0000" to "1111."

Figure 17:
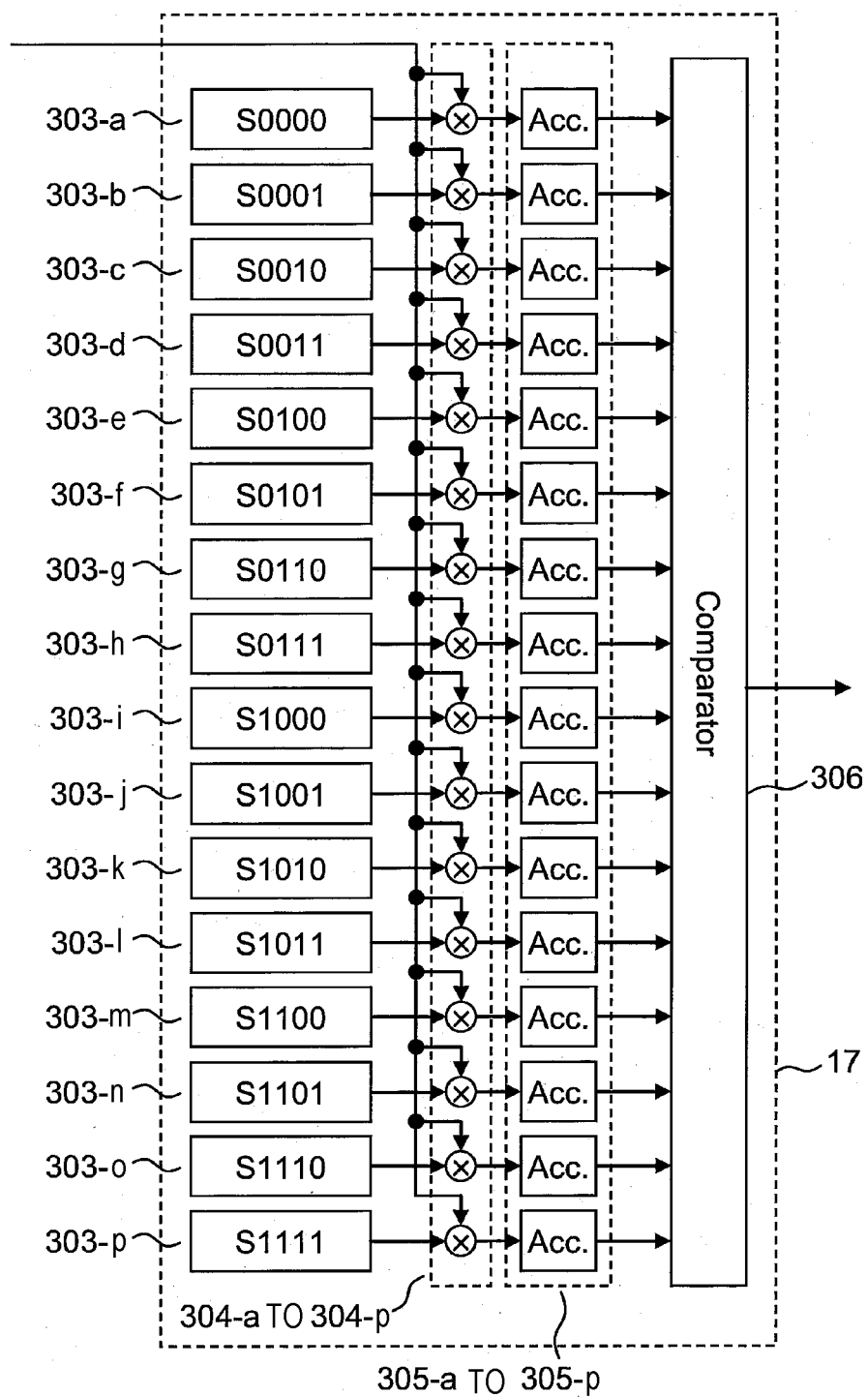
FIG. 17 is a diagram illustrating an exemplary configuration of a 16-level demodulator according to the present invention.

An exemplary configuration of the demodulator 17 according to the present embodiment is illustrated in FIG. 17 below. The demodulator 17 calculates the correlation values between a reception signal and the pulse sequences S0000 to S1111 at timings detected by the preamble synchronization unit 16, and performs demodulation assuming a sequence with the largest correlation value as being transmitted. That is, at first, the pulse sequences S0000 to S11 are generated by pulse sequence generators 303-*a* to 303-*p* at timings detected by the preamble synchronization unit 16, respectively. The generated pulse sequences S0000 to S1111 are multiplied by the reception signal in multipliers 304-*a* to 304-*p*, respectively. The multipliers 304-*a* to 304-*p* can be simply configured in the logical product (AND) operation similarly to the multipliers 104-*a*, 104-*b*, 204-*a*, 204-*b*, 204-*c* and 204-*d*. The multiplication results are accumulated by sequence lengths in accumulators 305-*a* to 305-*p* and are output as the correlation values, respectively. When accumulations in the sequence lengths are completed, the correlation values are compared in a comparator 306, and the largest output among the outputs from the accumulators 305-*a* to 305-*p* is determined, and corresponding demodulation data "0000" to "1111" is output as a demodulation result based on the determination.

The pulse sequences S0000 to S1111 used in the present embodiment can be designed in the pulse sequence design procedures. For example, there are indicated, in the table of FIG. 18, the correlation characteristics of the sequences designed and obtained assuming the number of pulse positions N (sequence length) where pulses can be arranged as 128, the number of arranged pulses P as 24, the number of generated pulse sequences M as 16, and the maximum permitted value K of cross-correlation as 11. The correlation values in FIG. 18 are only the maximum values among the correlation values obtained by mutually shift in time domain. The characteristics such as autocorrelation value P=24 and maximum value of cross-correlation K=11 are obtained matching to the design conditions. That is, when communication is made by use of the pulse sequences S0000 to S1111 having the correlation characteristics of FIG. 18 according to the present embodiment, erroneous demodulation due to multipath does not occur in any two-wave multipath environment due to P/K=24/11>2 similarly to the first embodiment and the second embodiment. Erroneous demodulation hardly occurs even in a three- or more-wave multipath environment.

The present invention for performing 16-level modulation has been described above. In comparison with the second embodiment, a 64-pulse position time and 12 pulses are used for transmitting two bits in the second embodiment, while a 128-pulse time and 24 pulses are used for transmitting four bits in the third embodiment, and the transmission rate and the transmission energy per bit are equal to each other. However, the communication system according to the present invention is a kind of M-ary system, and noise resistance is much higher than in the second embodiment due to the property that noise resistance is higher in the 16-ary transmission than in the 4-ary transmission.

Figures 19, 20:
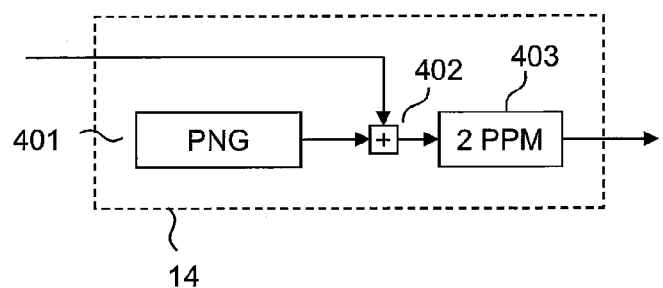
FIG. 19 is a diagram illustrating other exemplary correlation characteristics of the pulse sequences used for the 16-level modulator according to the present invention.
FIG. 20 is a diagram illustrating other exemplary configuration of the two-level modulator according to the present invention.

It is also possible to use the sequences designed and obtained assuming the number of pulse positions N (sequence length) where pulses can be arranged as 256, the number of arranged pulses P as 64, the number of generated pulse sequences M as 16, and the maximum permitted value K of cross-correction as 31 instead of the pulse sequences whose correlation characteristics are illustrated in FIG. 18. As illustrated in FIG. 19, the obtained correlation characteristics have the autocorrelation value P=64, but an actual maximum value for the maximum permitted value K=31 of cross-correlation is 29 for cross-correlation between S0000 and S1101, which sufficiently meets the design conditions. Thus, an error due to multipath is much less likely to occur. The transmission rate is half of that using the pulse sequences with N=128, while the energy used for transmission per bit further increases and thus longer distance communication is enabled.

As described above, the communication method according to the present invention can flexibly change multipath-resistance and transmittable distance depending on a design of pulse sequences. Thus, it is desirable to switch pulse sequences to be used according to a communication environment.

Fourth Embodiment

An exemplary communication method for performing two-level modulation with a different configuration from the first embodiment will be described in the present embodiment. The present embodiment is different from the first embodiment in that a plurality of pulse sequences is used for which the peaks of cross-correlation values are lower than the peaks of autocorrelation values and the cross-correlation values correctable by error correction are lower than a predetermined value (½ in the present embodiment) of the peaks of autocorrelation values. The entire configuration of the wireless communication device and the radio frequency (RF) unit are as previously illustrated in FIG. 4 and FIG. 5, respectively, and are the same as in the first embodiment, and thus a description thereof will be omitted.

An exemplary configuration of the modulator 14 according to the present embodiment is illustrated in FIG. 20. The modulator in FIG. 20 is of a modulation unit of one bit, and performs a two-level modulating operation of generating and sending any of two pulse sequences per input bit. A pseudo random number generator 401 generates a two-level pseudo random number sequence. Exclusive OR between the two-level pseudo random number sequence and input data is operated in an exclusive OR operator 402. An exclusive OR operation result is subjected to two-level PPM modulation as illustrated in FIG. 1 in a 2 PPM modulator 403, and is output. With the above operation, different random number pulse sequences are generated between an input bit of 0 and an input bit of 1. The pseudo random number generator 401 can use a general random number generator such as M-sequence generator. Input data into the modulator 14 is assumed to be updated whenever a pulse sequence having a modulation pulse sequence length corresponding to the modulation unit is output. The random number sequences may be initialized in modulation unit, or the random number sequences may be initialized immediately after preamble and not be initialized until the last of the frame and thus the pulse sequences may sequentially change.

The demodulator 17 according to the present embodiment may assume the pulse sequences S0 and S1 generated by the pulse sequence generators 101-*a* and 101-*b* in the configuration of the demodulator illustrated in FIG. 7 as a modulation pulse sequence output when 0 is input into the modulator of FIG. 20 and a modulation pulse sequence output when 1 is input therein, respectively.

Figure 25:
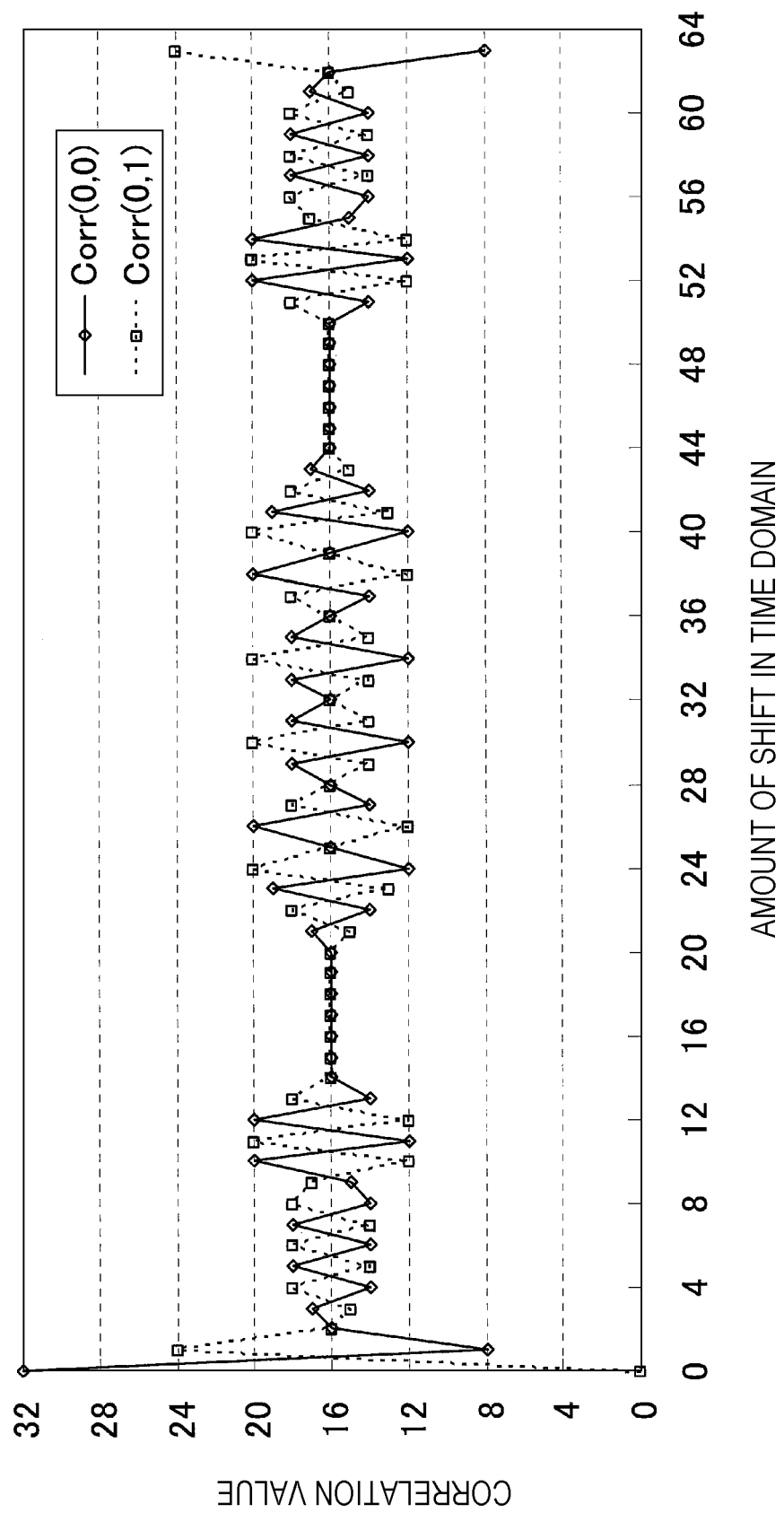
FIG. 25 is a diagram illustrating exemplary correlation characteristics of pule sequences output from the two-level modulator of FIG. 20.

Exemplary correlation characteristics of the sequences generated by the modulator 14 according to the present embodiment are illustrated in FIG. 25. Corr(0, 0) indicates autocorrelation characteristics of the modulation pulse sequence (sequence 0) for the input bit 0, and Corr (0, 1) indicates cross-correlation characteristics of the modulation pulse sequence (sequence 0) for the input bit 0 and the modulation pulse sequence (sequence 1) for the input bit 1. The pulse sequences whose correlation characteristics are illustrated in FIG. 25 are of the modulation pulse sequence length N=64, the number of pulses P=32 and the number of pulse sequences M=2 based on the symbols used in the pulse sequence design procedures described in the first embodiment. In the example of FIG. 25, the maximum value of cross-correlation is 24, which largely exceeds 16 which is half the autocorrelation P=32. Thus, according to the previous discussion, an error can occur even in a two-wave multipath environment. However, since a cross-correlation value at time-domain shift 0 where the autocorrelation peak of the sequence 0 is obtained is 0, even if any delay wave with a delay is superimposed, the cross-correlation value at a timing when the autocorrelation peak value of 32 is obtained is up to 24 for one wave. Thus, according to the present embodiment, erroneous demodulation due to multipath does not occur in any two-wave multipath environment.

More generally, if a sum of the cross-correlation value when the time-domain shift is 0 and the maximum value of the cross-correlation value other than when the time-domain shift is 0 does not reach the autocorrelation value, erroneous demodulation due to multipath does not occur in a two-wave multipath environment. Thus, it is desirable to set the pulse sequences having the property for S0 and S1 also in the modulator 14 according to the first embodiment.

Fifth Embodiment

An exemplary communication method for performing four-level modulation having a different configuration from the second embodiment will be described according to the present embodiment. The present embodiment is different from the second embodiment in that a plurality of sequence pulses is used for which the peaks of cross-correlation values are lower than the peaks of autocorrelation values and a cross-correlation value correctable by error correction is lower than a predetermined value (½ in the present embodiment) of the peaks of autocorrelation values. An entire configuration of the wireless communication device and the radio frequency (RF) unit are as previously illustrated in FIG. 4 and FIG. 5, respectively, and are the same as in the first embodiment, and thus a description thereof will be omitted.

Figures 21, 22:
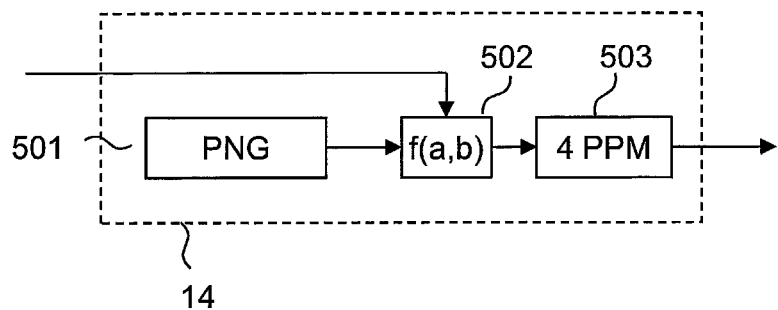
FIG. 21 is a diagram illustrating other exemplary configuration of the four-level modulator according to the present invention.
FIG. 22 is a diagram illustrating an exemplary operation of a converter used for the four-level modulator of FIG. 21.
Figures 23, 24:
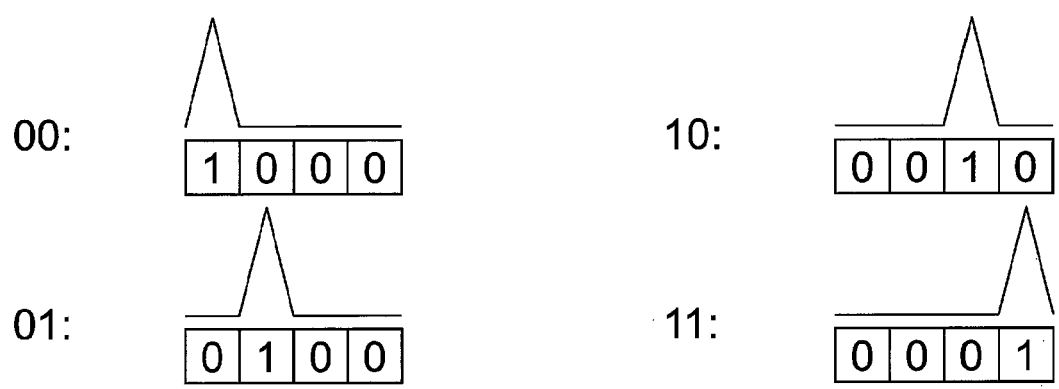
FIG. 23 is a diagram illustrating an exemplary operation of the converter when the four-level modulator of FIG. 21 is used as a two-level modulator.
FIG. 24 is a diagram illustrating exemplary four-level PPM used for the four-level modulator of FIG. 21.

An exemplary configuration of the modulator 14 according to the present embodiment is illustrated in FIG. 21. The modulator in FIG. 21 is of a modulation unit of two bits, and performs a four-level modulating operation of generating and sending any of the four pulse sequences per input two bits. A pseudo random number generator 501 generates a four-level (00:0, 01:1. 10:2, 11:3) pseudo random number sequence. The random number values of the four-level pseudo random number sequence are converted by input data in a converter 502 and are output. The converter 502 outputs any of the four-level values 0(00), 1(01), 2(10) and 3(11) illustrated in the table of FIG. 22 to a pseudo random number sequence (PN) and data input (DATA). The outputs of the converter 502 are subjected to four-level PPM modulation as illustrated in FIG. 24 in a 4 PPM modulator 503 and are output. With the above operation, when the input bits are 00 (0), 01(1), 10(2) and 11 (3), different random number pulse sequences are generated therefor, respectively. The pseudo random number generator 501 can be configured by separating its outputs per two bits and outputting them by use of a general random number generator such as M-sequence generator. Input data into the modulator 14 is assumed to be updated whenever a pulse sequence having a modulation pulse sequence length corresponding to the modulation unit is output similarly to the fourth embodiment. Further, a random number sequence may be initialized in the modulation unit, or may be initialized immediately after preamble and not be initialized until the last of the frame and thus the pulse sequence may sequentially change.

The demodulator 17 according to the present embodiment may assume the pulse sequences S00 to S11 generated by the pulse sequence generators 201-a to 201-d as the modulation pulse sequences output when 00, 01, 10 and 11 are input into the modulator of FIG. 21, respectively, in the configuration of the demodulator illustrated in FIG. 13.

Figure 26:
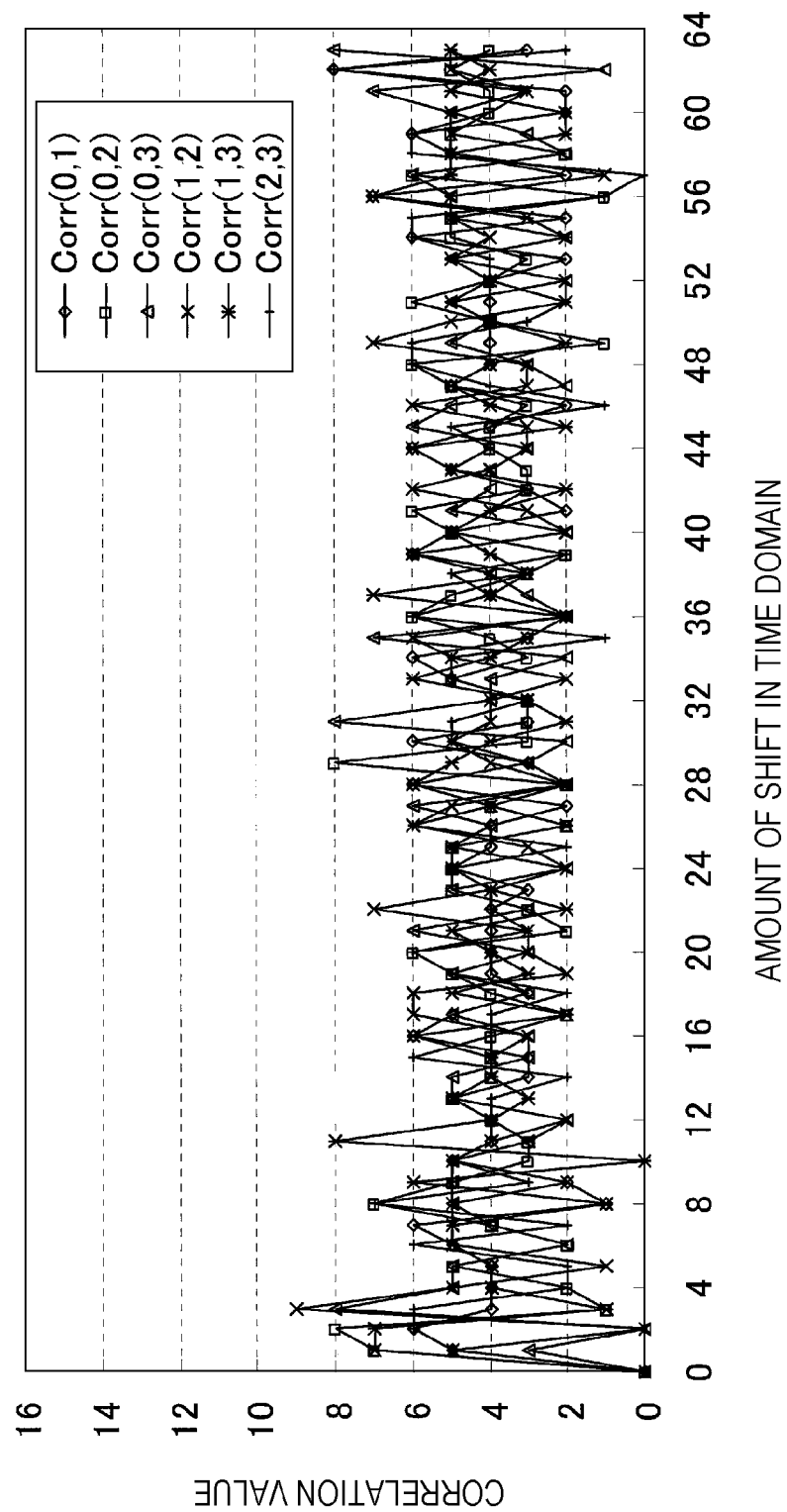
FIG. 26 is a diagram illustrating exemplary correlation characteristics of pulse sequences output from the four-level modulator of FIG. 21.
Figure 27:
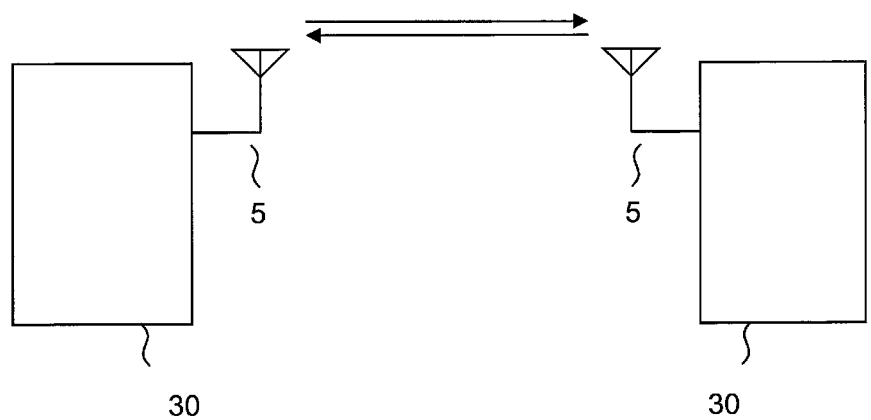
FIG. 27 is a diagram illustrating communication between the wireless transceiving devices of FIG. 4.

Exemplary cross-correlation characteristics of the sequences generated by the modulator 14 according t the present embodiment are illustrated in FIG. 26. The notation of Corr(a, b) indicates cross-correlation characteristics between a modulation pulse sequence for an input bit a and a modulation pulse sequence for an input bit b. The pulse sequences whose correlation characteristics are illustrated in FIG. 26 have the modulation pulse sequence length N=64, the number of pulses P=16, and the number of pulse sequences M=4 according to the symbols used in the pulse sequence design procedures described in the first embodiment. In the example of FIG. 26, the maximum value of a cross-correlation value is up to 9, which exceeds 8 which is half the autocorrelation value P=16. However, similarly to the example described in the fourth embodiment, since the cross-correlation value is 0 when the time-domain shift is 0, erroneous demodulation due to multipath does not occur in any two-wave multipath environment. Since the second highest cross-correlation value is 8 in a three-wave multipath environment, an error can occur when they are superimposed and received. However, since most of the cross-correlation values are equal to or less than 6, there is provided the characteristics in which even if the cross-correlation value 0 at the time-domain shift where the peak of autocorrelation is obtained is superimposed on the cross-correlation value of other two waves, an error does not occur in most cases and high multipath-resistance is provided.

Thus, for all the cross-correlations between different sequences, it is possible to make incoherent UWB-IR communication with improved multipath-resistance by performing modulation as illustrated in FIG. 6, FIG. 12 or FIG. 16 for transmission by use of a plurality of sequences for which a sum of the cross-correlation value when the time-domain shift is 0 and the maximum value of the cross-correlation value other than when the time-domain shift is 0 does not reach the autocorrelation value.

As in the present embodiment, when there are used a plurality of sequences for which the maximum value of a cross-correlation value is lower than the autocorrelation value and most of the cross-correlation values are lower than the autocorrelation value, such as equal to or less than ½ or ⅓ of the cross-correlation value, under the above condition, even if a sum of the cross-correlation value when the time-domain shift is 0 and the maximum value of the cross-correlation value other than when the time-domain shift is 0 exceeds the autocorrelation value, erroneous demodulation due to multipath is least likely to occur, which is compensated by error correction and consequently high multipath-resistance can be realized.

REFERENCE SIGNS LIST

1 Interface unit
2 Processor
3 Baseband signal processing unit
4 Radio frequency unit 5 Antenna
11 Transmission buffer
12 FCS addition unit
13 Error correction encoder
14 Modulator
15 Preamble addition unit
16 Preamble synchronization unit
17 Demodulator
18 Error correction decoder
19 FCS checking unit
20 Reception buffer
21 Pulse generator
22, 25, 27 Band-pass filter
23 Power amplifier (PA)
24 Antenna switch
26 Low noise amplifier (LNA)
28 Envelope detector
29 Pulse shaping unit
30 Wireless communication device
101-a to 101-b, 103-a to 103-b, 201-a to 201-d, 203-a to 203-d,
301-a to 301p, 303-a to 303-p Pulse sequence generator
102, 202, 302 Selector
104-a to 104-b, 204-a to 204-d, 304-a to 304-p Multiplier
105-a to 105-b, 205-a to 205-d, 305-a to 305-p Accumulator
106, 206, 306 Comparator
401, 501 Pseudo random number generator
402 Exclusive OR operator
402 2PPM modulator
502 Converter
504 4PPM modulator

The invention claimed is:

1. An incoherent wireless communication method comprising:
a first step of modulating transmission data;
a second step of converting the modulated transmission data into pulses and converting received pulses into reception data; and
a third step of demodulating the reception data,
wherein the pulses used in the second step include a plurality of pulse sequences,
the plurality of pulse sequences is such that peaks of cross-correlation values thereof are lower than peaks of auto-correlation values thereof,
the first step comprises selecting and modulating any of the plurality of pulse sequences in a modulation unit,
the plurality of pulse sequences is such that any cross-correlation value thereof is lower than the peak autocorrelation value thereof, and
the plurality of pulse sequences is such that any cross-correlation value thereof correctable by error correction is lower than ½ of the peak of an autocorrelation value thereof.

2. The wireless communication method according to claim 1,
wherein the first step is to generate and modulate the plurality of pulse sequences in modulation unit.

3. The wireless communication method according to claim 1,
wherein the wireless communication method employs a UWB-IR system.

4. A wireless communication device using an incoherent wireless communication method, the device comprising:
a modulation unit configured to modulate transmission data;
a radio frequency unit configured to convert the transmission data modulated in the modulation unit into pulses and to convert received pulses into reception data; and
a demodulation unit configured to demodulate the reception data,
wherein the pulses used in the radio frequency unit include a plurality of pulse sequences,
the plurality of pulse sequences is such that peaks of cross-correlation values thereof are lower than peaks of auto-correlation values thereof,
the modulation unit is configured to generate and modulate the plurality of pulse sequences, and
the plurality of pulse sequences is such that any cross-correlation value thereof correctable by error correction is lower than ½ of the peak autocorrelation thereof.

5. The wireless communication device according to claim 4,
wherein the modulation unit is to select and modulate any of the plurality of pulse sequences in modulation unit.

6. The wireless communication device according to claim 4,
wherein the wireless communication method employs a UWB-IR system.

* * * * *